US009972349B1

(12) United States Patent
French, Jr.

(10) Patent No.: US 9,972,349 B1
(45) Date of Patent: May 15, 2018

(54) DATA STORAGE DEVICE WITH TWO READ ELEMENTS OFFSET RADIALLY BY AT LEAST ONE SERVO TRACK AT ALL RADIAL LOCATIONS

(71) Applicant: Western Digital Technologies, Inc., San Jose, CA (US)

(72) Inventor: James B. French, Jr., Whitefish, MT (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days. days.

(21) Appl. No.: 15/690,858

(22) Filed: Aug. 30, 2017

(51) Int. Cl.
G11B 5/596 (2006.01)
G11B 5/012 (2006.01)

(52) U.S. Cl.
CPC .......... G11B 5/59627 (2013.01); G11B 5/012 (2013.01)

(58) Field of Classification Search
CPC .................... G11B 5/012; G11B 5/02; G11B 5/596–5/59694
USPC ........................... 360/75–77.11, 78.04–78.14
See application file for complete search history.

(56) References Cited

U.S. PATENT DOCUMENTS

| 6,952,322 | B1 | 10/2005 | Codilian |
| 7,916,416 | B1 | 3/2011 | Guo et al. |
| 8,203,800 | B2* | 6/2012 | Li ...................... G11B 20/1201 360/77.08 |
| 8,508,880 | B2* | 8/2013 | Gao ........................ G11B 5/596 360/75 |
| 8,514,506 | B1 | 8/2013 | Li et al. |
| 8,861,111 | B1* | 10/2014 | Liao ........................ G11B 5/09 360/55 |
| 8,902,536 | B1* | 12/2014 | Hwang .............. G11B 5/59627 360/75 |
| 8,953,276 | B1* | 2/2015 | Pokharel ............ G11B 5/59627 360/75 |
| 9,013,821 | B1 | 4/2015 | Chen |
| 9,013,824 | B1* | 4/2015 | Guo .................... G11B 5/59655 360/75 |
| 9,026,728 | B1 | 5/2015 | Xi et al. |
| 9,053,724 | B1 | 6/2015 | Chahwan et al. |
| 9,070,406 | B1 | 6/2015 | Li et al. |
| 9,087,541 | B1* | 7/2015 | Pokharel ............ G11B 5/59627 |
| 9,093,119 | B1* | 7/2015 | Hwang ............ G11B 20/10009 |
| 9,129,630 | B1 | 9/2015 | Guo et al. |
| 9,147,431 | B2 | 9/2015 | Lammers et al. |
| 9,245,556 | B2 | 1/2016 | Brunnett et al. |
| 9,286,926 | B1 | 3/2016 | Dhanda et al. |
| 9,305,593 | B2* | 4/2016 | Hwang .................... G11B 5/56 |
| 9,311,937 | B2* | 4/2016 | Zou ........................ G11B 5/455 |

(Continued)

Primary Examiner — Wayne Young
Assistant Examiner — James L Habermehl

(57) ABSTRACT

A data storage device is disclosed comprising a head actuated over a disk surface comprising a plurality of servo tracks, wherein the head comprises at least two read elements including a first read element and a second read element, and at least two of the read elements are offset radially relative to a center of the two read elements by at least a width of a servo track at all radial locations of the head over the disk surface. First servo data recorded in a first servo track is read using the first read element to generate a first read signal, and second servo data recorded in a second servo track is read using the second read element to generate a second read signal. The head is servoed over the disk surface based on at least the first read signal and the second read signal.

18 Claims, 15 Drawing Sheets

(56) References Cited

U.S. PATENT DOCUMENTS

| | | | |
|---|---|---|---|
| 9,396,744 B1* | 7/2016 | Yamashita | G11B 5/3912 |
| 9,401,167 B2* | 7/2016 | Pokharel | G11B 5/59627 |
| 9,576,597 B2* | 2/2017 | Trantham | G11B 5/5543 |
| 9,761,258 B2* | 9/2017 | Haapala | G11B 5/59688 |
| 9,792,939 B2* | 10/2017 | Mendonsa | G11B 5/59627 |
| 9,875,758 B1* | 1/2018 | Trantham | G11B 5/596 |
| 2005/0283653 A1* | 12/2005 | Noguchi | G11B 5/012 |
| | | | 714/6.12 |
| 2011/0317299 A1 | 12/2011 | Kubota et al. | |

* cited by examiner

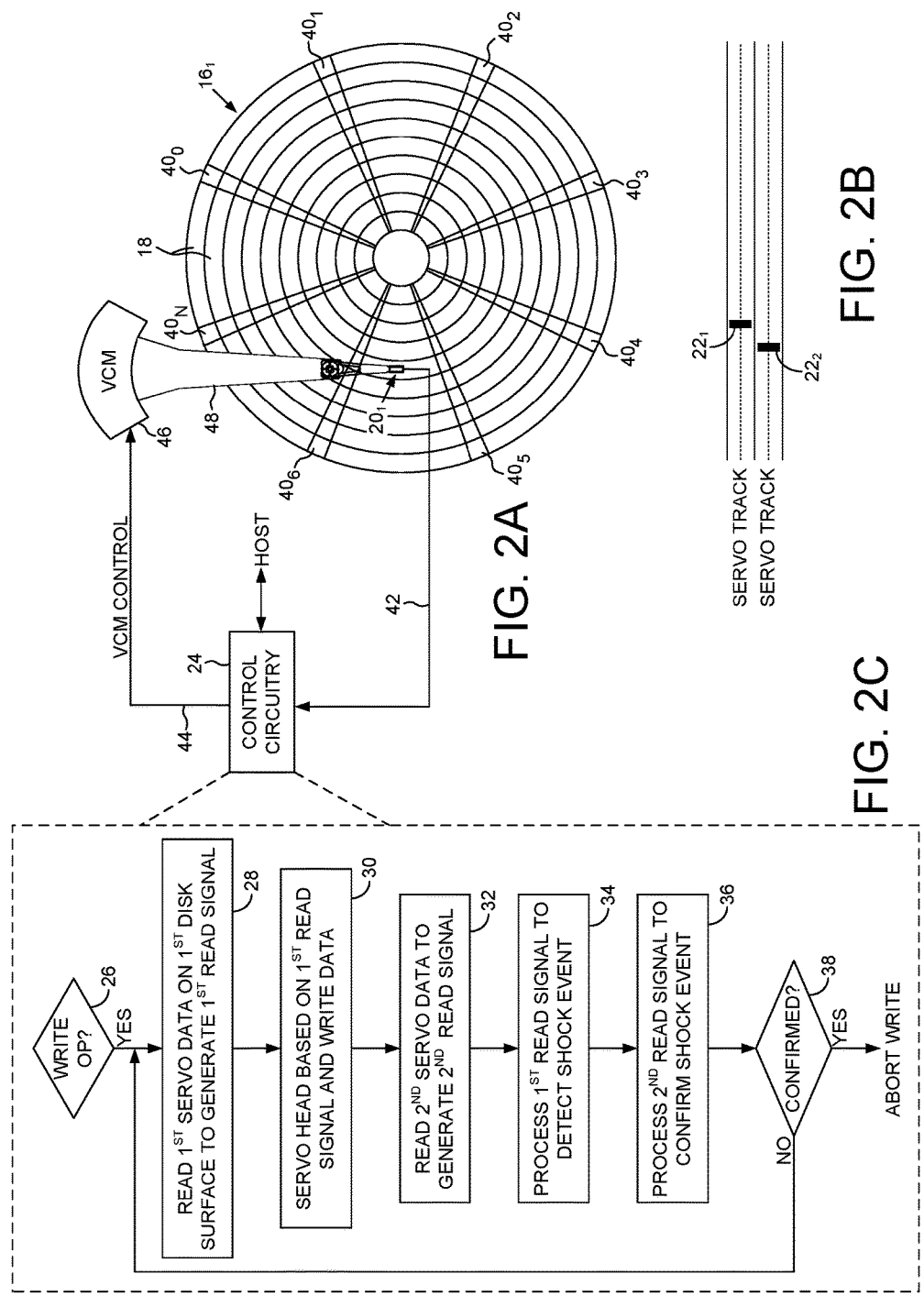

DATA STORAGE DEVICE WITH TWO READ ELEMENTS OFFSET RADIALLY BY AT LEAST ONE SERVO TRACK AT ALL RADIAL LOCATIONS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A show a data storage device in the form of a disk drive comprising a head actuated over a disk surface.

FIG. 2B shows an embodiment wherein the disk drive comprises a first read element offset radially from a second read element.

FIG. 2C is a flow diagram according to an embodiment wherein during a write operation a write abort is conditioned on a read signal generated by a secondary read element.

DETAILED DESCRIPTION

Figure 1:
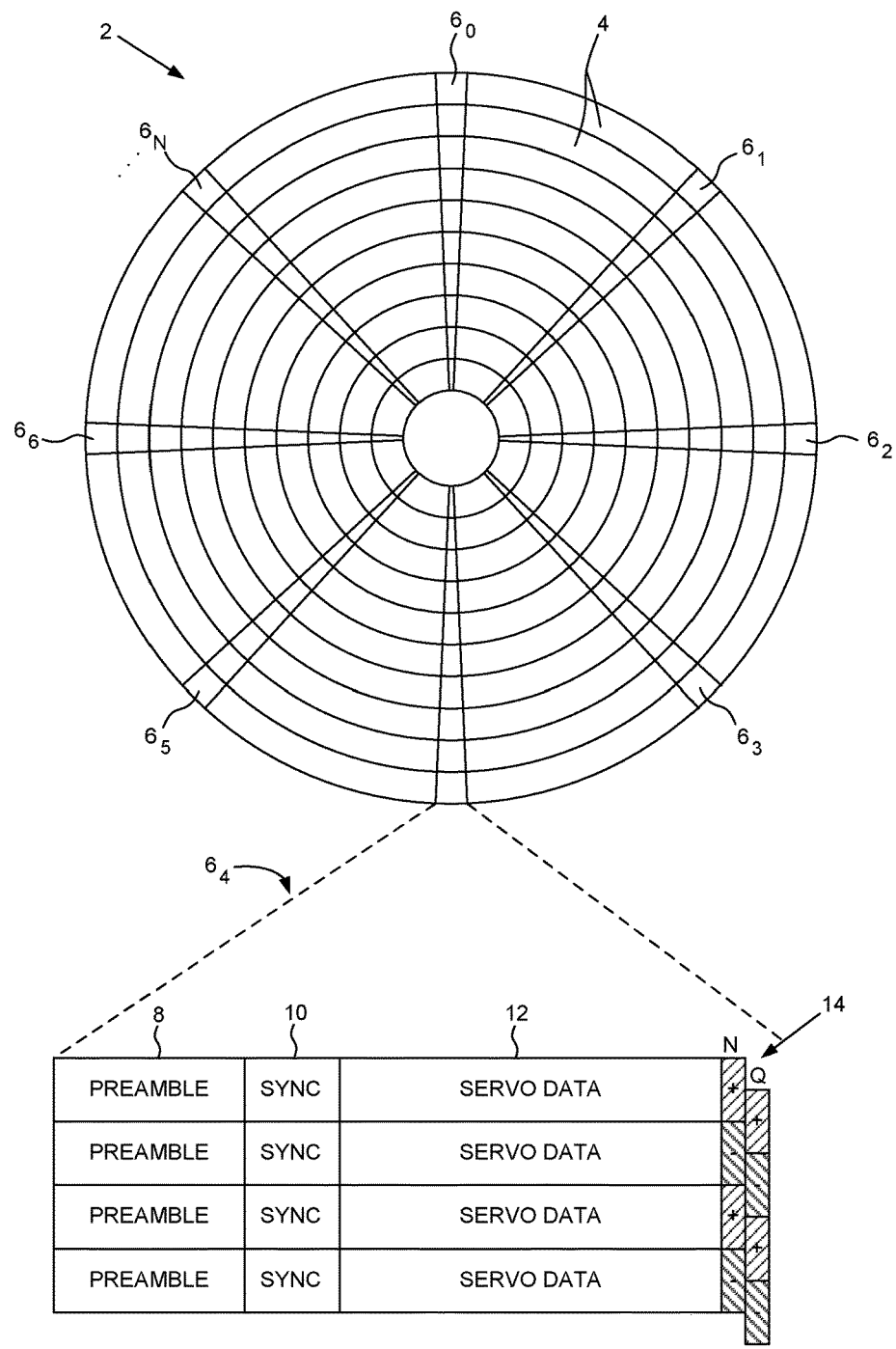
FIG. 1 shows a prior art disk format comprising a plurality of servo tracks defined by servo sectors.

FIGS. 2A and 2B show a data storage device in the form a disk drive according to an embodiment comprising a first disk surface $16_1$ comprising a plurality of servo tracks 18, and a first head $20_1$ actuated over the first disk surface $16_1$, wherein the first head $20_1$ comprises a first read element $22_1$. The disk drive further comprises a second read element $22_2$ and control circuitry 24 configured to execute the flow diagram of FIG. 2C. During a write operation (block 26) first servo data in a first servo track is read using the first read element to generate a first read signal (block 28), and the first head is servoed over a first servo track based on the first read signal while writing data to the first disk surface (block 30). Second servo data is read using the second read element to generate a second read signal (block 32). When the first read signal indicates a shock event is affecting the servoing of the first head (block 34) and the second read signal confirms the shock event (block 36), the write operation is aborted (block 38).

In the embodiment of FIG. 2A, the first disk surface $16_1$ comprises a plurality of servo sectors $40_0$-$40_N$ that define the servo tracks 18, wherein the servo sectors $40_0$-$40_N$ may comprise any suitable head position information, such as a track address for coarse positioning and servo bursts for fine positioning. Data tracks may be defined relative to the servo tracks 18 at the same or different radial density. The control circuitry 24 processes a read signal 42 emanating from the first element $22_1$ to demodulate the servo sectors $40_0$-$40_N$ and generate a position error signal (PES) representing an error between the actual position of the first head and a reference position relative to a target track. A servo control system in the control circuitry 24 filters the PES using a suitable compensation filter to generate a control signal 44 applied to a voice coil motor (VCM) 46 which rotates an actuator arm 48 about a pivot in order to actuate the first head $20_1$ radially over the first disk surface $16_1$ in a direction that reduces the PES. The servo bursts may comprise any suitable pattern, such as an amplitude based servo pattern or a phase based servo pattern (FIG. 1).

Figure 3A:
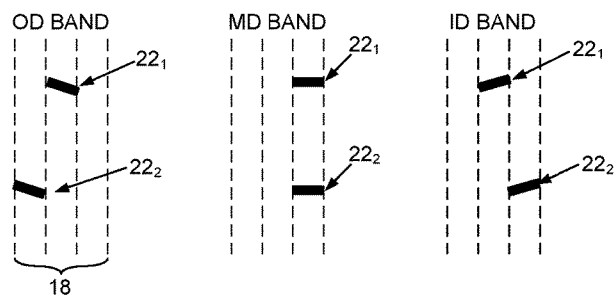
FIG. 3A shows an embodiment wherein first and second read elements of a head are offset radially across an outer diameter band of servo tracks and an inner diameter band of servo tracks.

In one embodiment, the first head $20_1$ comprises the first read element $22_1$ and the second read element $22_2$, such as being fabricated on a slider. The read elements may have any suitable orientation relative to one another, wherein in an embodiment shown in FIG. 3A, the read elements $22_1$ and $22_2$ are offset along the length of a servo track and aligned radially near a middle diameter of the disk surface such that both read elements read the same servo track. When the head is positioned toward the outer or inner diameter of the disk surface, the skew angle of the head results in a radial offset between the read elements $22_1$ and $22_2$ so that at least part of each read element may be positioned over different servo tracks as illustrated in FIG. 3A.

In one embodiment, when the radially offset between the read elements $22_1$ and $22_2$ is sufficiently small such that both read elements are positioned at least partially over the same data track, the read signals from both read elements may be processed in order to read user data recorded in the data track. For example, the read signals may be averaged in any suitable manner, such as at the input of a read channel, or at any point within two read channels, such as by averaging the signal samples of the read signals. In another embodiment, the two read signals may be processed using any suitable two-dimensional (2D) magnetic recording (TDMR) technique, including the use of 2D to 2D equalization or 2D to 1D equalization techniques. In one embodiment, as the skew angle of the head increases the radial offset between the read elements $22_1$ and $22_2$ may become sufficiently large as shown in FIG. 3A such that there is insufficient overlap of the read elements to enable multi-signal techniques to recover the user data. In this case, the read signal from a single one of the read elements may be processed to recover user data using any suitable one-dimensional (1D) technique. In an embodiment described below, the head may comprise three or more read elements wherein a pair of the read elements for multi-signal processing may be selected out of the total available based on the radial location of the head (and skew angle of the head). That is, as the skew angle of the head changes, the pair of read elements selected may change so as to extend the radial band of data tracks that may be recovered using any suitable multi-signal processing technique.

In one embodiment the servo bursts in a servo sector may be corrupted due to a media defect, contaminate, or other anomaly thereby corrupting the PES generated when reading the servo bursts. The corrupted PES may falsely indicate the head is being subjected to a shock event causing the control circuitry to perform an unnecessary write abort. Prior art disk drives have compensated for corrupted servo bursts by learning non-repeatable runout values (NRRO) and generating corresponding compensation values written to the disk surface (e.g., at the end of a servo sector). During a write operation, the PES is adjusted by the NRRO compensation values so that a write abort is not triggered. However, learning the NRRO and writing the compensation values to the disk may require a significant amount of time, particularly when there is a large number of servo tracks per disk surface. This NRRO learning and writing can significantly increase the manufacturing time and expense of the disk drive.

In one embodiment, when the radial offset between the read elements becomes sufficiently large such that two or more read elements are positioned at least partially over different servo tracks, the read signals from the multiple read elements may be processed in order to augment the servo system. For example, instead of compensating for a defective servo burst by adjusting the PES using a NRRO compensation value, in one embodiment the read signal from at least one secondary read element may be processed to confirm a shock event before aborting a write operation as described above with reference to the flow diagram of FIG. 2C. In one embodiment, when a shock event is not confirmed by a secondary read element, the PES generated by reading a defective servo burst may be replaced with a PES generated for a previous servo sector or with a PES generated by a state estimator. In another embodiment, the PES may be adjusted, for example, based on a position detected by the secondary read element instead of adjusting the PES using a NRRO compensation value.

Figure 4A:
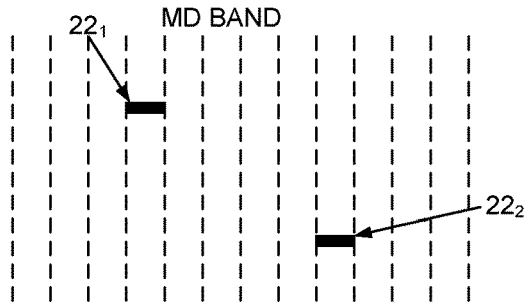
FIGS. 4A-4C show an embodiment wherein a first read element is offset radially from a second read element relative to a center of the read elements by at least a width of a servo track at all radial locations of the head over the disk surface.
Figure 4B:
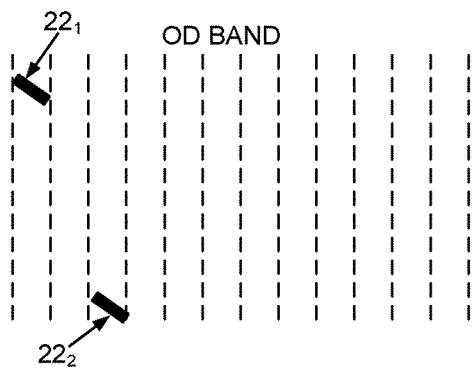
Figure 4C:
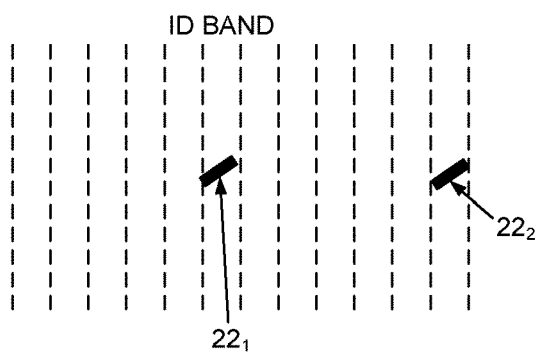

In one embodiment, the head $20_1$ may comprise at least two read elements, wherein at least two of the read elements are offset radially relative to their centers by at least a width of a servo track at all radial locations of the head over the disk surface. FIGS. 4A-4C show an example of this embodiment wherein a first read element $22_1$ is offset radially from a second read element $22_2$ relative to a center of the read elements by at least a width of a servo track at all radial locations of the head over the disk surface. In this embodiment, the benefit of using a secondary read element to augment the servo system may be realized at all radial locations, but at a cost of losing multi-signal processing performance (e.g., TDMR performance) due to the large radial offset between the two read elements at all radial locations.

Figure 5A:
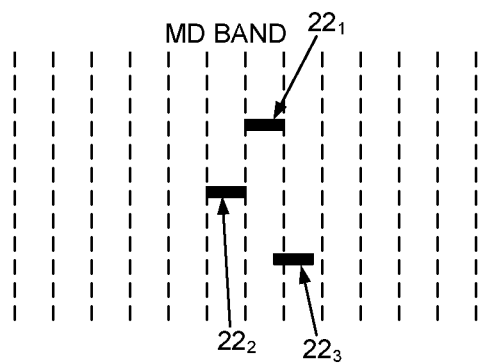
FIGS. 5A-5C show an embodiment wherein the head comprises three read elements and two of the read elements are offset radially relative to a center of the two read elements by at least a width of a servo track at all radial locations of the head over the disk surface.
Figure 5B:
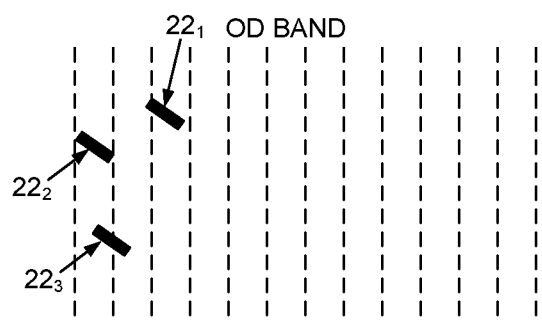
Figure 5C:
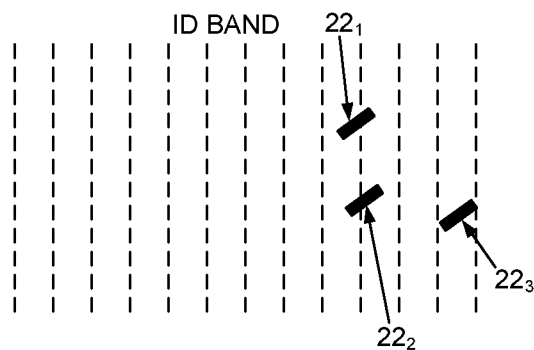

FIGS. 5A-5C show an embodiment wherein the head $20_1$ may comprise more than two read elements (three in this example). A center of the first read element $20_1$ is offset radially from a center of the second read element $22_2$ by at least a width of a servo track over a first radial band of the servo tracks (in the example of FIGS. 5A and 5B, from a middle diameter to an outer diameter of the disk surface). A center of the first read element $20_1$ is offset radially from a center of the third read element $20_3$ by at least a width of a servo track over a second radial band of the servo tracks (in the example of FIGS. 5A and 5C, near a middle diameter to an outer diameter of the disk surface). In this embodiment, at least two of the read elements are offset radially relative to a center of the two read elements by at least a width of a servo track at all radial locations of the head over the disk surface. In one embodiment, at least two read elements may overlap over at least part of the disk surface so that a suitable multi-signal processing technique (e.g., TDMR) may be employed to recover user data, wherein the read elements selected for servo control and multi-signal processing may change relative to their radial offsets as the radial location of the head changes.

Figure 6:
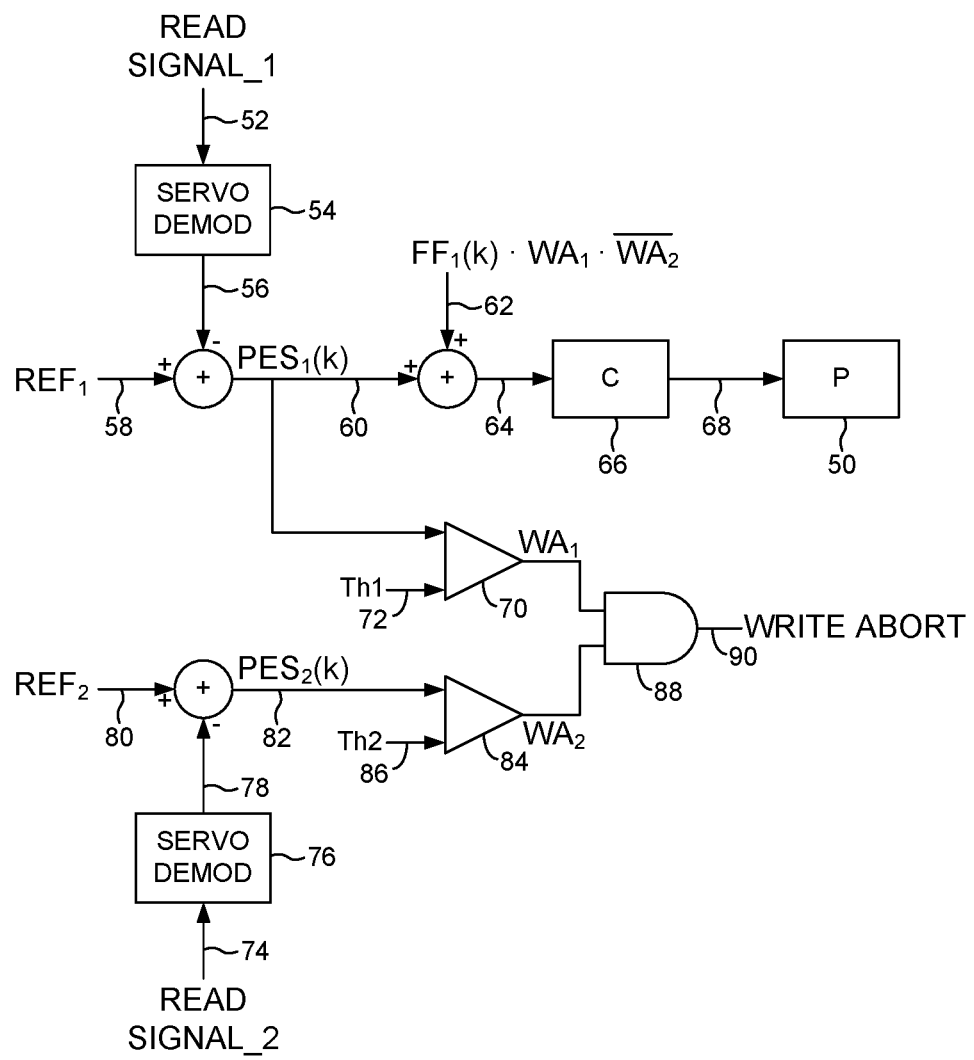
FIG. 6 shows an embodiment wherein a position error signal (PES) is generated for each read element, and a write abort event detected by the PES of the first read element is confirmed by the PES of the second read element before aborting a write operation.

FIG. 6 shows servo control circuitry according to an embodiment comprising an actuator feedback loop including an actuator P 50 (e.g., the VCM 46 of FIG. 2A) for actuating at least one head over at least one disk surface. A first read element generates a first read signal 52 by reading first servo data in a first servo track, and the first read signal 52 is demodulated (block 54) into a position signal 56 representing a first estimated position of the first read element over the disk surface. The first estimated position 56 is subtracted from a first reference position 58 to generate a first $PES_1$ 60. The first $PES_1$ 60 is optionally adjusted by a compensation value 62, and the adjusted $PES_1$ 64 processed by a suitable servo compensator C 66 to generate a control signal 68 applied to the actuator P 50 in order to actuate the head in a direction that reduces the first $PES_1$ 60. The first $PES_1$ 60 is compared 70 to a first threshold 72, and a first write abort signal $WA_1$ is activated when the first $PES_1$ 60 exceeds the first threshold 72, for example, due to a shock event affecting the servoing of the head. A second read signal 74 generated by a second read element reading second servo data in a second servo track is processed to confirm a shock event detected based on the first $PES_1$ 60. The second read signal 74 is demodulated (block 76) into a position signal 78 representing a second estimated position of the second read element over the disk surface. The second estimated position 78 is subtracted from a second reference position 80 to generate a second $PES_2$ 82 which is compared 84 to a second threshold 86 to generate a second write abort signal $WA_2$ which enables the first write abort signal $WA_1$ through AND gate 88. In this manner, a write abort signal 90 is activated when a shock event is detected by the first $PES_1$ 60 and confirmed by the second $PES_2$ 82. When the second $PES_2$ 82 does not confirm a shock event, it is assumed that the large amplitude of the first $PES_1$ 60 is due to a defect in the first servo data (e.g., a defect in a servo burst) rather than to a shock event.

In one embodiment, when a shock event is detected by the first $PES_1$ 60 that is not confirmed by the second $PES_2$ 82, the first $PES_1$ 60 may be replaced with the value generated for the previous servo sector, or replaced with a PES generated by a state estimator. In an alternative embodiment shown in FIG. 6, the first $PES_1$ 60 may be adjusted by a compensation value 62 generated, for example, based on the second estimated position 78 of the second read element. In one embodiment, the compensation value 62 may be generated based on a difference between an estimated radial offset between the read elements and a measured radial offset generated based on the measured first $PES_1$ 60 and the measured second $PES_2$ 82. That is, the first $PES_1$ 60 may be adjusted by a compensation value 62 so that the adjusted $PES_1$ 64 corresponds to the estimated radial offset of the read elements at the current radial location of the head. In one embodiment, the difference between the estimated radial offset and the measured radial offset may be used to confirm a shock event detected by the first $PES_1$ 60. For example, a shock event may be confirmed if the difference between the estimated and measured radial offsets does not exceed a threshold.

Figure 7:
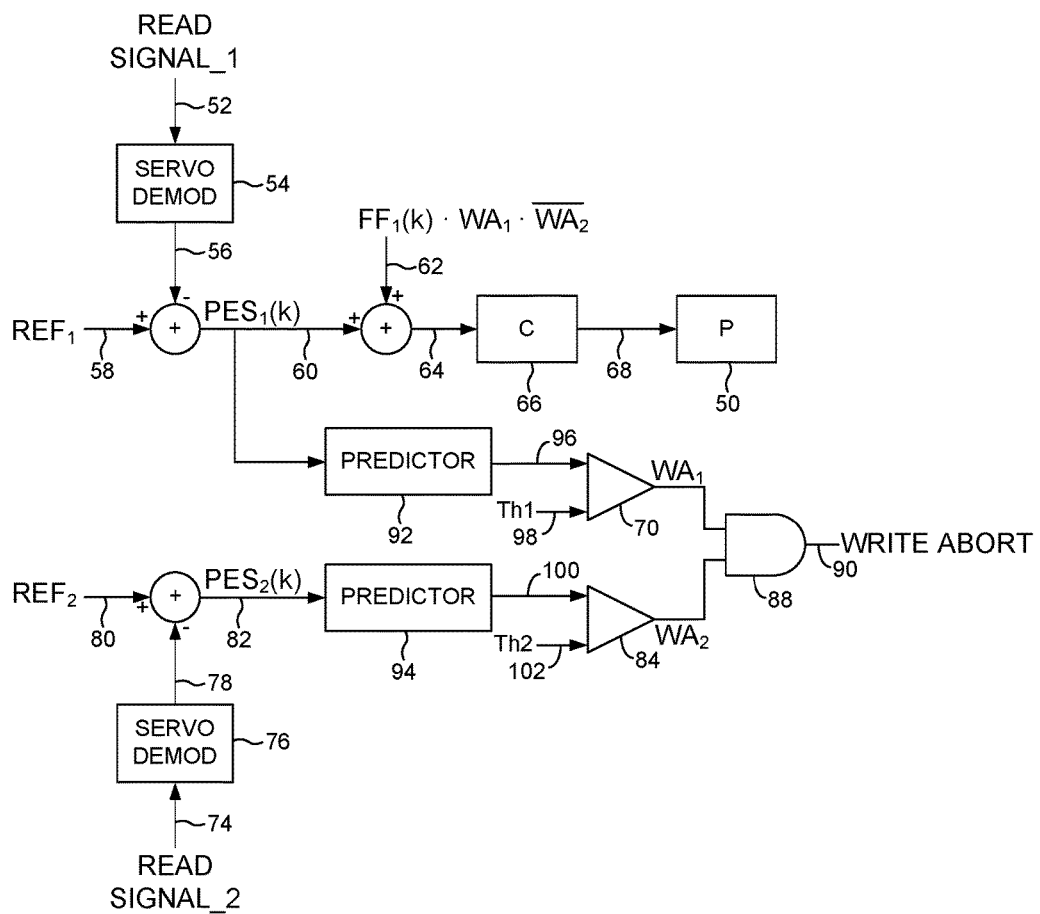
FIG. 7 shows an embodiment wherein a predicted PES is generated for each read element, and a write abort event detected by the predicted PES of the first read element is confirmed by the predicted PES of the second read element before aborting a write operation.

FIG. 7 shows servo control circuitry according to an embodiment comprising a first predictor 92 and a second predictor 94 each configured to generate a predicted PES of the read elements. The predictors 92 and 94 may implement any suitable predication algorithm, such as a predication algorithm based on:

$$\hat{X}_n(k+1)=2\bullet\hat{X}_n(k)-\hat{X}_n(k-1)$$

where $\hat{X}_n(k+1)$ represents the predicted PES at the next servo sector, $\hat{X}_n(k)$ represents the PES at the current servo sector, and $\hat{X}_n(k-1)$ represents the PES at the previous servo sector. In this embodiment, the first write abort signal $WA_1$ is activated when the first predicted $PES_1$ 96 exceeds a first threshold 98, and the shock event is confirmed when the second predicted $PES_1$ 100 exceeds a second threshold 102. In one embodiment, a shock event may be detected and/or confirmed based on both the PES and the predicted PES.

Figure 3B:
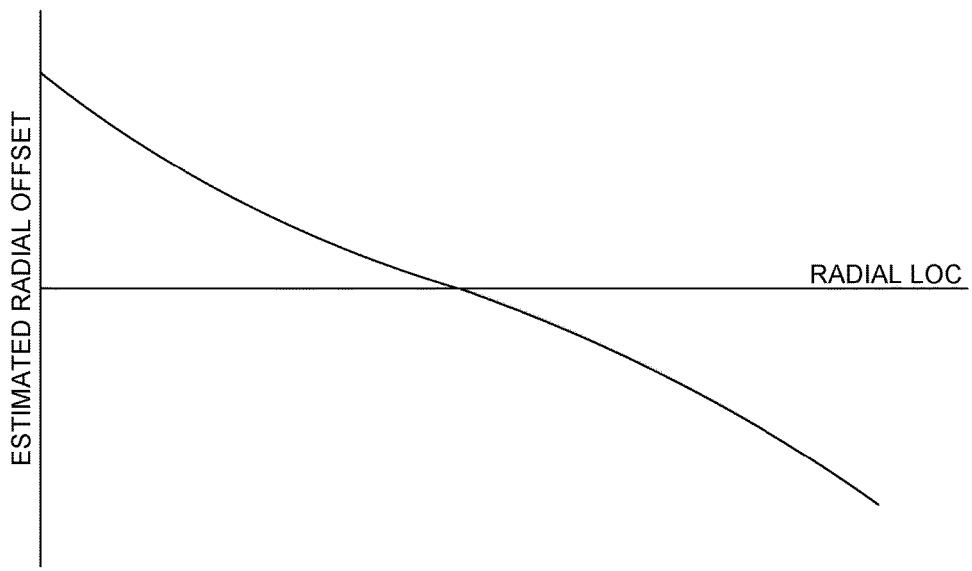
FIG. 3B shows an embodiment wherein the radial offset between the read elements is estimated based on a radial location of the head over the disk.
Figure 8:
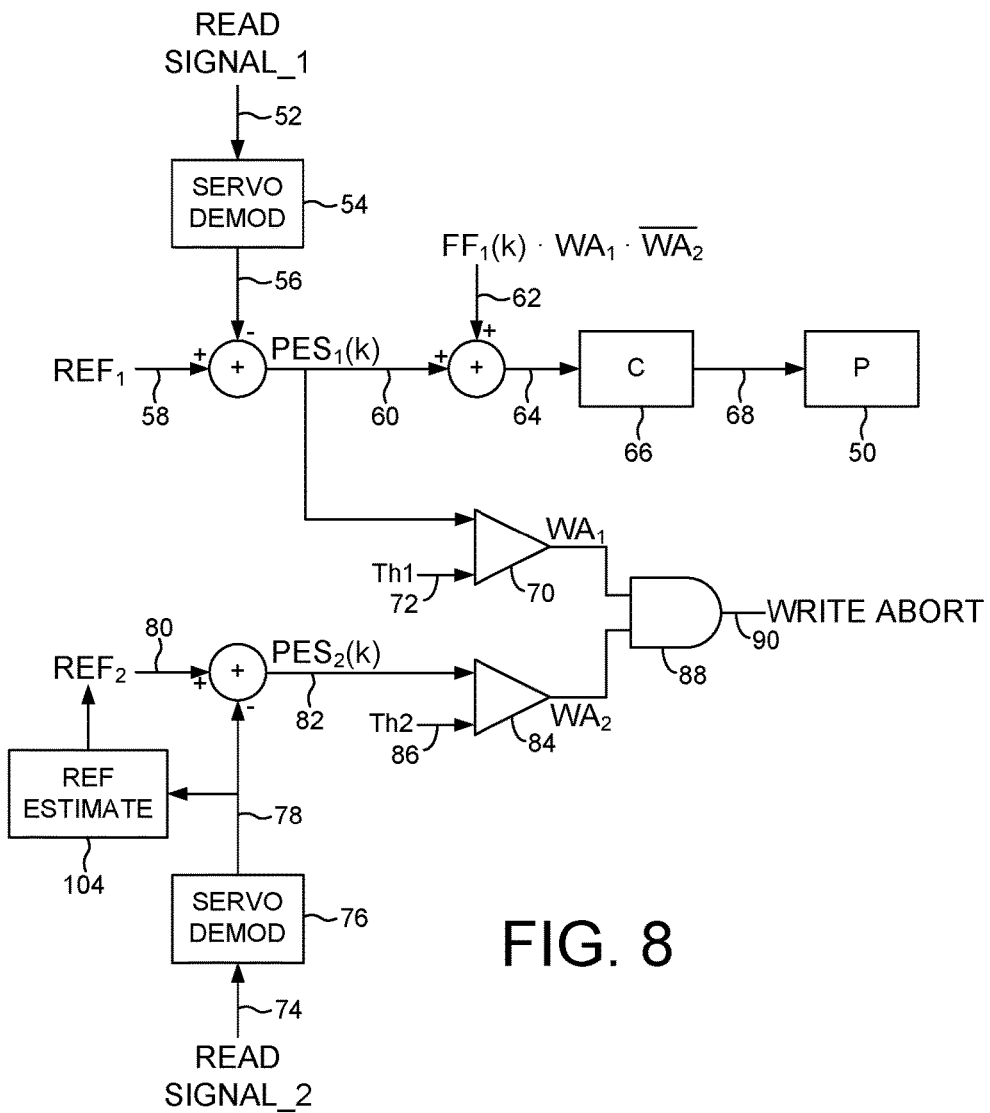
FIG. 8 shows an embodiment wherein prior to writing data to the disk surface during a write operation, a reference position for the second read element is generated based on servo data read from the disk surface.

In the embodiments described above, the second reference position 80 may be generated in any suitable manner. In one embodiment, the second reference position 80 may be generated based on an estimated radial offset between the read elements at the current radial location of the head. For example, the control circuitry may measure the radial offset of the read elements at various radial locations across the disk surface and curve fit the measurements to a suitable polynomial function such as shown in FIG. 3B. The second reference position 80 may then be generated using this polynomial function with the first reference position 58 as the input value. In an alternative embodiment shown in FIG. 8, the second reference position 80 may be generated (or updated) based on the estimated radial position 78 of the second read element reading the second servo data in the second servo track. For example, prior to writing data to the disk the first read element may be servoed over the first servo track based on the first $PES_1$ 60 during a tracking operation. During this tracking operation the second reference position 80 may be generated (block 104) based on the second read element reading the second servo data in the second servo track. In addition, the second reference position 80 may be further updated while writing data to the disk at each servo sector where the first write abort signal $WA_1$ is not activated. For example, in one embodiment block 104 may generate the second reference position 80 as the average of the second estimated radial position 78 of the second read element, or based on any other suitable algorithm, such as any suitable low pass filter.

Figure 9:
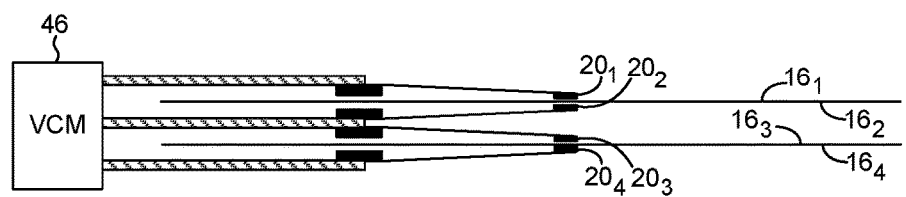
FIG. 9 shows an embodiment wherein the first read element may be fabricated on a first head, and the second read element may be fabricated on a second head.

In the above embodiments, the first and second read elements may be fabricated on the same head such as shown in FIG. 3A. In another embodiment shown in FIG. 9, the first read element $22_1$ may be fabricated on a first head $20_1$ actuated over a first disk surface $16_1$, and the second read element $22_2$ may be fabricated on a second head $20_2$ actuated over a second disk surface $16_2$. Accordingly in this embodiment a second read element of a second head may be used to confirm a shock event before aborting a write operation. In one embodiment, the read signal from a secondary read element of a primary head together with a read signal from a secondary read element of a secondary head may be processed to confirm a shock event.

Figure 10A:
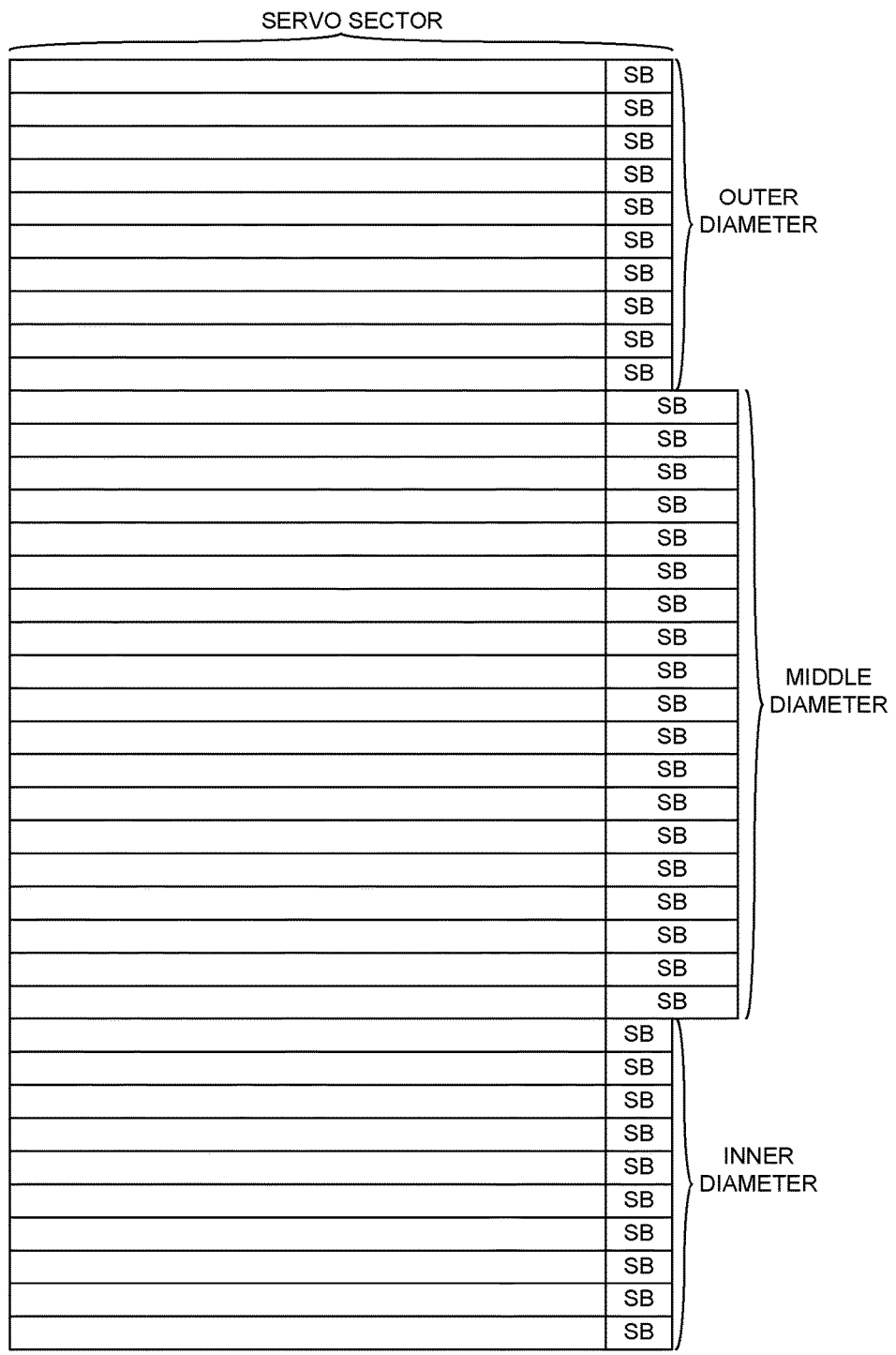
FIG. 10A shows an embodiment wherein across a first radial band of the servo tracks the servo burst field comprises a first length, and across a second radial band of the servo tracks the servo burst field comprises a second length longer than the first length.
Figure 10B:
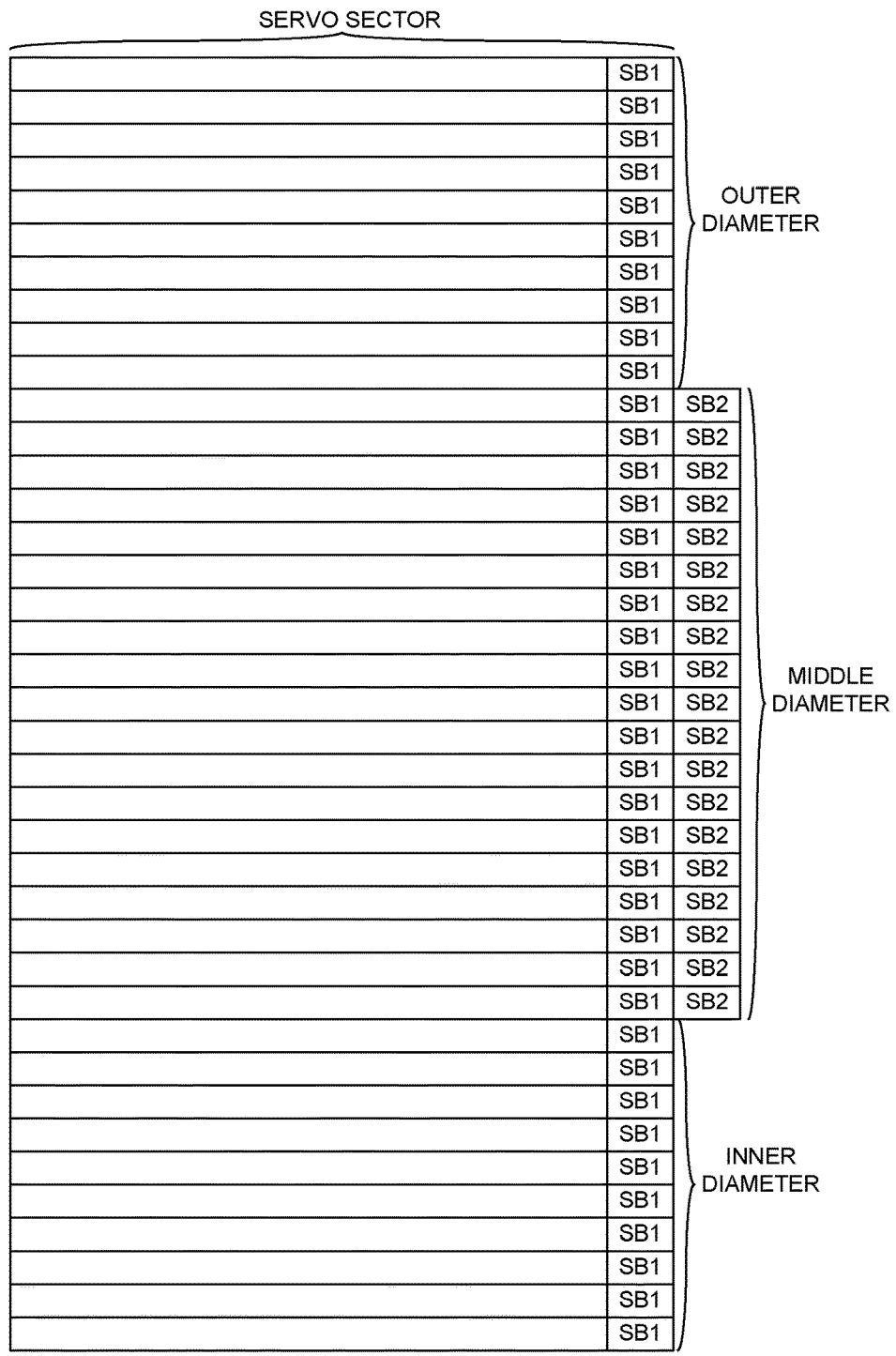
FIG. 10B shows an embodiment wherein the servo burst field of the first radial band consists of a single set of servo bursts and the servo burst field of the second radial band comprises multiple sets of servo bursts.

FIG. 10A shows an embodiment wherein across a first radial band of the servo tracks of a disk surface the servo burst (SB) field comprises a first length, and across a second radial band of the servo tracks the servo burst field comprises a second length longer than the first length. In the example of FIG. 10A, the first radial band comprises at least one of an outer diameter band of the servo tracks and an inner diameter band of the servo tracks, and the second radial band consists of a middle diameter band of the servo tracks. Also in the example of FIG. 10A, across the first radial band the SB field comprises a first servo burst having a first burst length, and across the second radial band the SB field comprises a second servo burst having a second burst length longer than the first burst length. The servo bursts may comprise any suitable format, such as the phase based N and Q servo bursts shown in FIG. 1, wherein the length of a servo bursts may be made longer by writing more magnetic transitions along the length of the servo track. In an alternative embodiment shown in FIG. 10B, across the first radial band the SB field comprises a single set of servo bursts (SB1) configured to generate a PES representing a position of the head relative to a servo track, and across the second radial band the SB field comprises multiple sets of servo bursts (e.g., SB1 and SB2) each configured to generate a PES of the head. For example, in one embodiment the set of N and Q phase based servo bursts shown in FIG. 1 may be duplicated in order to generate the multiple sets of servo bursts in the SB field.

In the embodiments employing different length SB fields, the head comprises a first read element and a second read element offset radially from the first read element when the head is over the first radial band of the servo tracks (e.g., over the outer diameter band shown in FIG. 10A). When the head is over the first radial band of the servo tracks, the head is servoed over the disk surface based on the first read element reading a first servo sector and the second read element concurrently reading a second servo sector different from the first servo sector. For example, the second read element may read a servo sector in a servo track adjacent to the servo track the first read element is reading such as shown in the OD band of FIG. 3A, or the second read element may read a servo sector in a servo track at least one servo track away from the servo track the first read element is reading such as sown in FIG. 4C. As described in the above embodiments, servoing the head over the disk surface by reading two servo tracks concurrently may augment the servoing of the head, such as by conditioning a write abort on a secondary read signal. When the head is over the second radial band of servo tracks, the multiple read elements may overlap the same data track so as to enable multi-signal processing (e.g., TDMR) in order to recover the recorded user data. However, this may also mean that over the second radial band of servo tracks the radial offset between the read elements may be too small to attain an increase in servo performance from concurrently reading different servo sectors. Accordingly in order to compensate for the decrease in servo performance, across the second radial band of servo tracks the length of the SB field is increased in order to increase the signal-to-noise ratio when reading the SB field using one or both of the read elements.

Figure 11A:
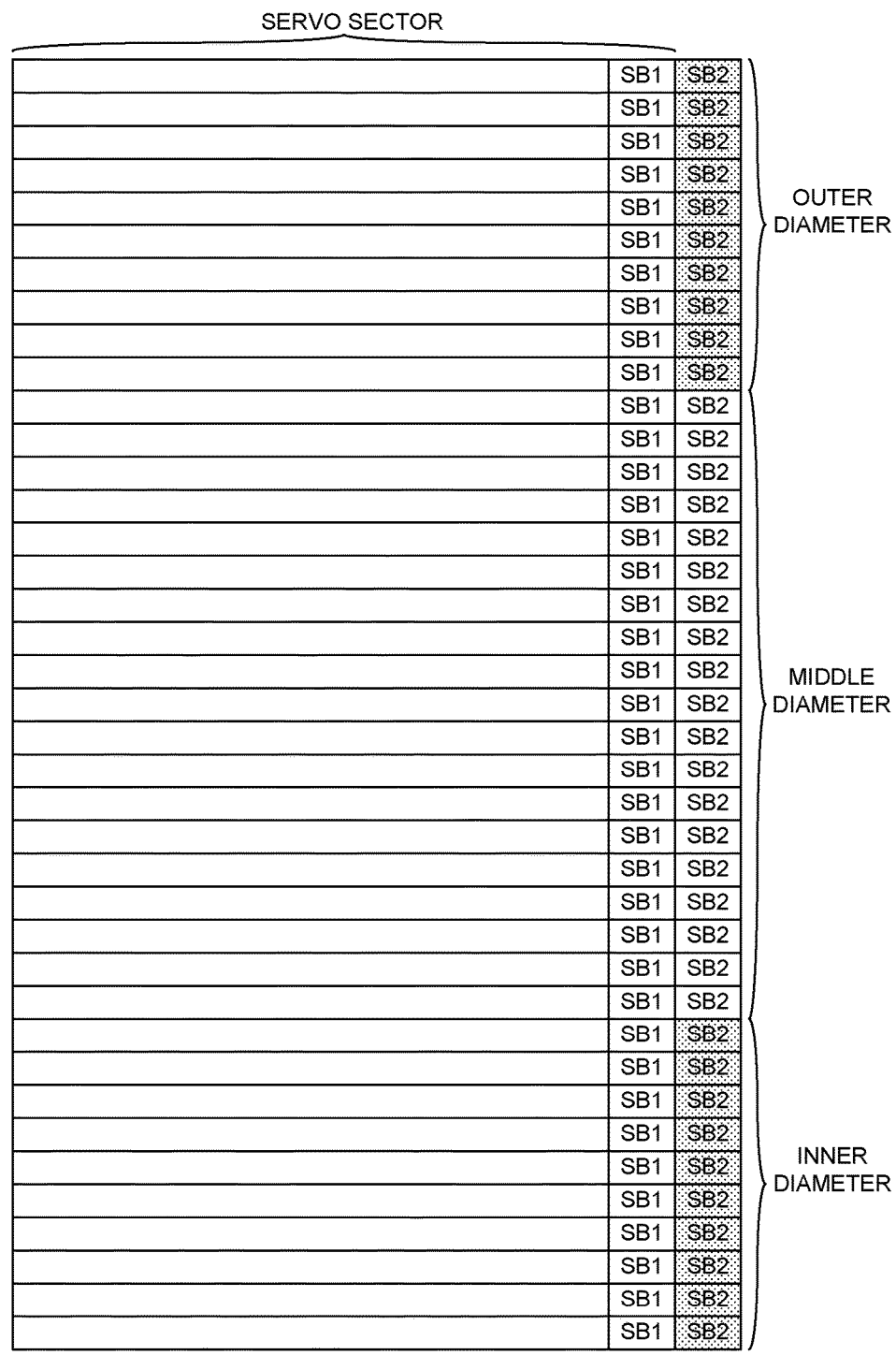
FIG. 11A shows an embodiment wherein the servo burst field is overwritten with user data across at least part of the disk surface in order to format at least part of the first radial band of servo tracks.
Figure 11B:
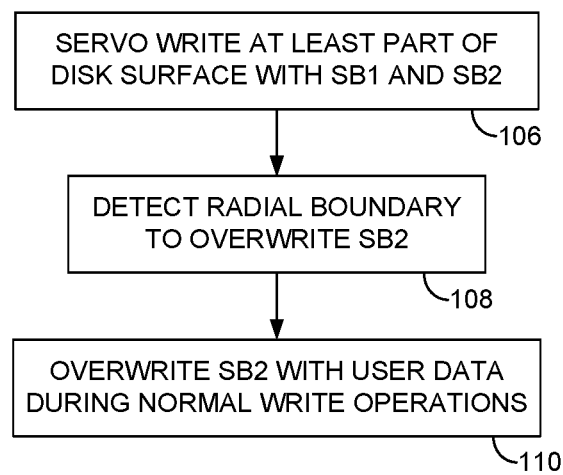
FIG. 11B is a flow diagram according to an embodiment wherein the second set of servo bursts at the outer and inner diameter bands of servo tracks are overwritten with user data, thereby truncating the servo burst field to the first length.

In one embodiment, the format of the servo tracks on the disk surface may be predetermined based on a nominal spacing (radial and down-track offsets) of the read elements. That is, the boundary (or boundaries) between the radial band of servo tracks that have different length SB fields may be predetermined at the time of servo-writing the disk surface based on an expected spacing of the read elements for a nominal head. In an alternative embodiment, the boundary (or boundaries) between the radial band of servo tracks may be calibrated for each disk drive by, for example, measuring the spacing of the read elements during a calibration procedure. In this embodiment, the second radial band of servo tracks may be initially servo written over an extended range of servo tracks, and then the SB field of the servo tracks truncated to the first length to the detected boundary by overwriting at least part of the SB field with user data during normal write operations. An example of this embodiment is shown in FIG. 11A which is understood with reference to the flow diagram of FIG. 11B. The servo sectors of the second radial band of servo tracks (at the middle diameter) are initially servo written with an extended SB field by writing two sets of servo bursts SB1 and SB2 (block 106). During a calibration procedure, the boundary of the first and second radial bands is detected, for example, by measuring the spacing of the read elements (block 108). Then during normal, in-the-field operation of the disk drive, the second set of servo bursts SB2 are overwritten with user data (block 110) thereby truncating the SB field across at least part of the first radial band of servo tracks down to the first length (down to a single set of servo bursts SB1 in the example of FIG. 11A).

Figure 12A:
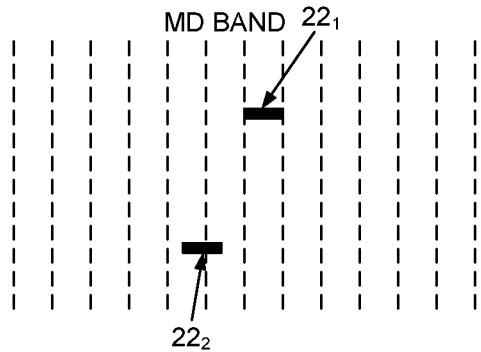
FIGS. 12A-12C show an embodiment wherein the first and second read elements may at least partially overlap across an inner diameter band of the servo tracks.
Figure 12B:
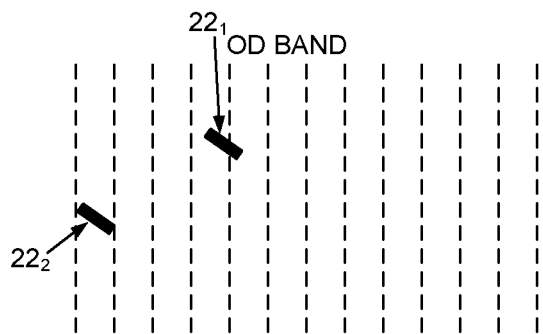
Figure 12C:
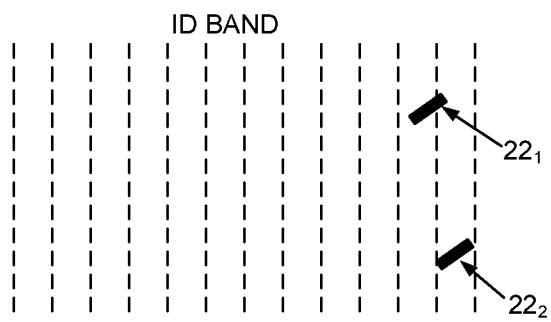
Figure 13:
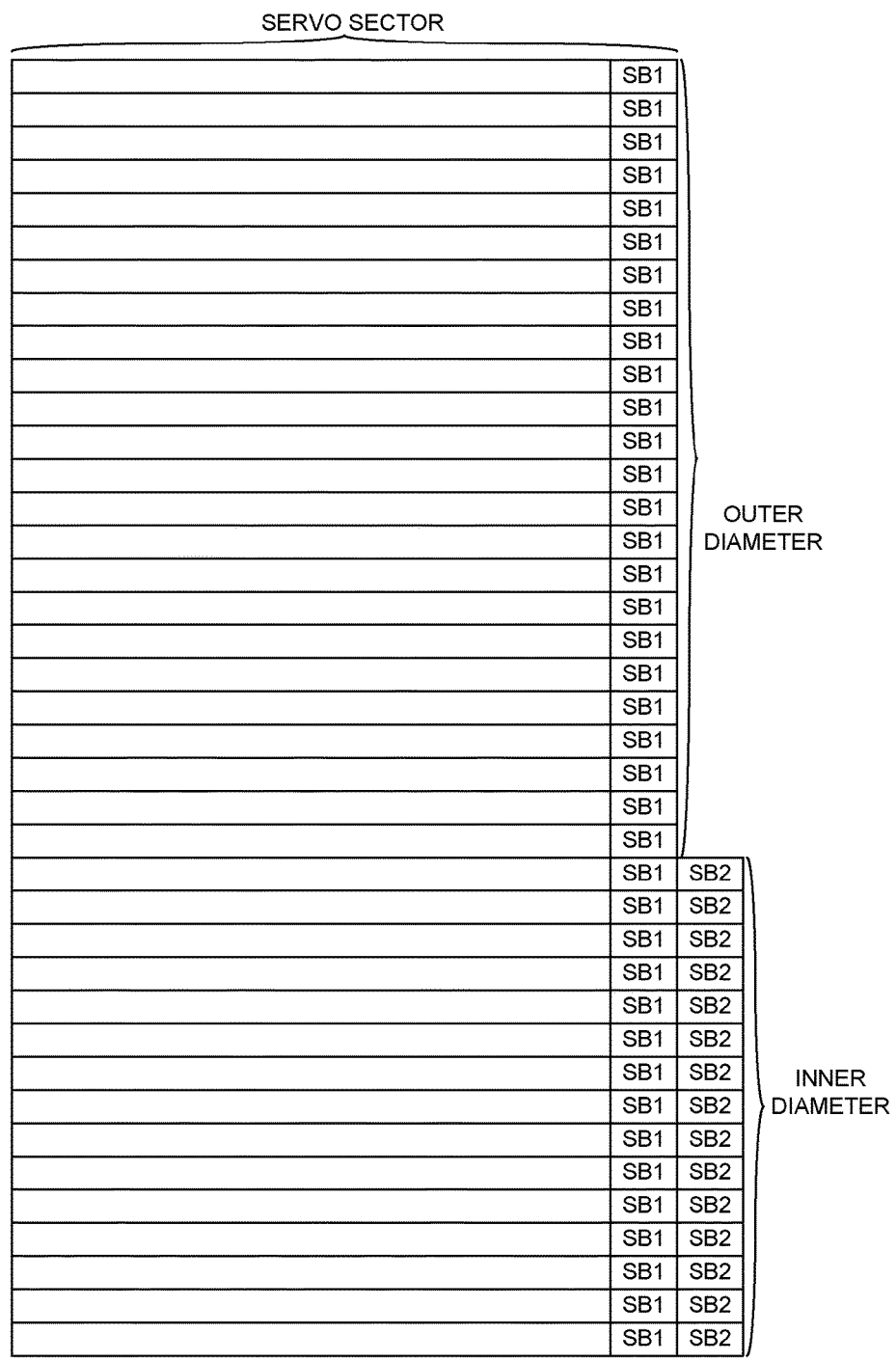
FIG. 13 shows an embodiment wherein the first radial band of servo tracks is an outer band of servo tracks and the second radial band of servo tracks is an inner diameter band of servo tracks.

The head may be fabricated with any suitable spacing of the read elements so as to achieve any suitable servo format. For example, in one embodiment it may be desirable to have the second radial band of servo tracks with an extended SB field and multi-signal processing of user data at the inner diameter of the disk surface or at the outer diameter of the disk surface. FIGS. 12A-12C show an example of spacing between read elements $22_1$ and $22_2$ resulting in an overlap of the read elements near the inner diameter of the disk surface and a radial separation of the read elements toward the outer diameter. A corresponding servo format is shown in FIG. 13 wherein the second radial band of servo tracks with the extended SB field is at the inner diameter of the disk surface and the first radial band of servo tracks with the shorter SB field is at the outer diameter of the disk surface. In an alternative embodiment, the read elements may be fabricated with a spacing so as to achieve the reverse servo format of FIG. 13; that is, with the second radial band of servo tracks at the outer diameter and the first radial band of servo tracks at the inner diameter.

Although the figures in the above embodiments show the read elements as having a width proximate the width of a servo track, in an alternative embodiment one or more of the read elements may have a width that spans less than a full servo track (e.g., eighty percent of a servo track), and in other embodiments one or more of the read elements may have a width that spans more than a full servo track. In one embodiment, the read elements of the head may be fabricated with relative radial and/or down-track offsets that may be selected based on a target width for the data tracks (i.e., a target track pitch). In another embodiment, the relative radial and/or down-track offsets of the read elements may be measured by the control circuitry 24 executing a suitable calibration procedure, and then the target track pitch (servo and/or data) selected based on the measured offsets. In one embodiment, the target track pitch may also be selected based on the width of the write element, and in another embodiment the data tracks may be written in a shingled manner so that the target track pitch may be selected based on an amount of overlap of the shingled data tracks.

The control circuitry 24 may employ any suitable technique to measure the spacing of the read elements. In one embodiment, the down-track offset between the read elements may be measured by measuring the relative time in detecting a radial coherent servo sync mark using each read element. That is, the read signal emanating from each read element may be processed separately using parallel sync mark detectors. A high frequency clock may then time a difference between when the servo sync mark is detected by each read element which may represent the relative down-track offset between the read elements.

Figure 14:
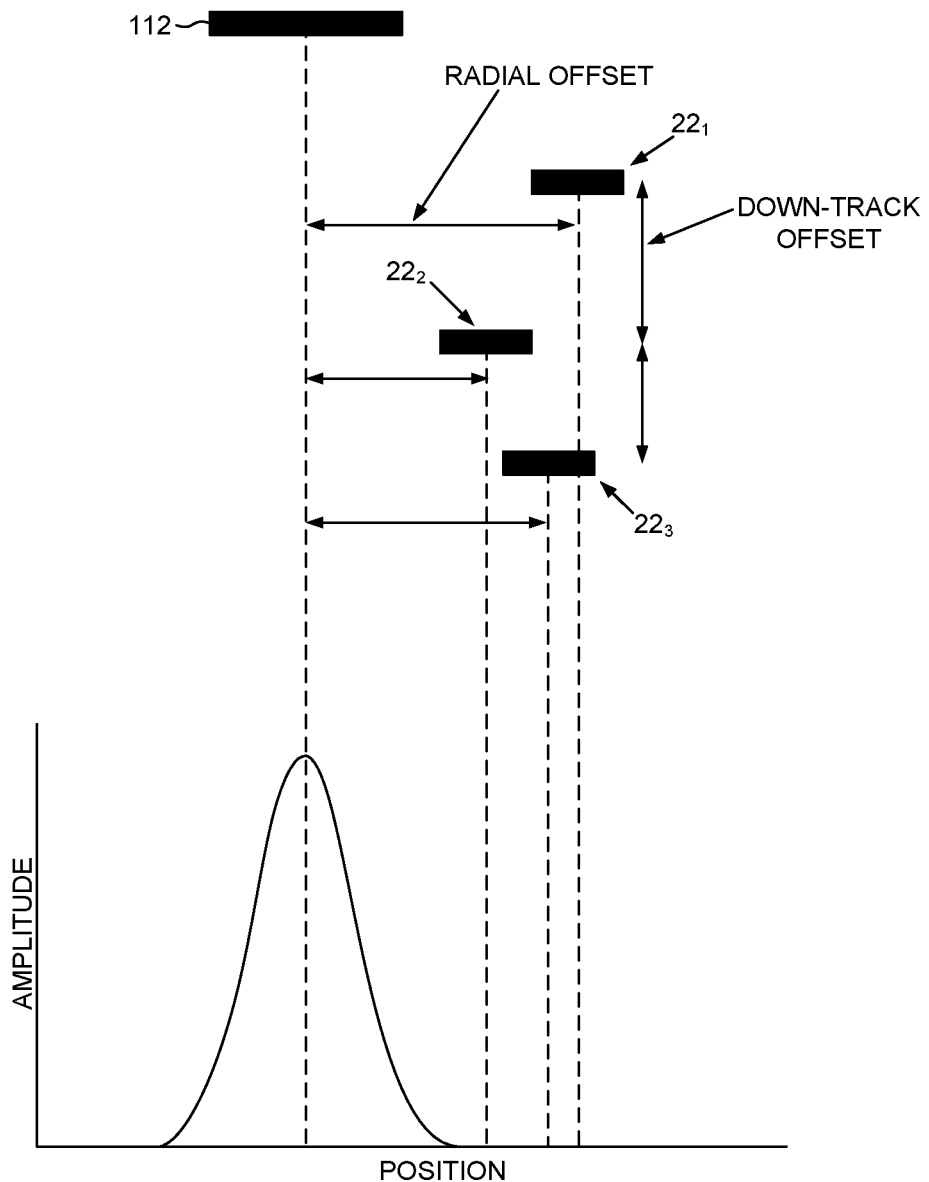
FIG. 14 shows an embodiment for measuring the spacing (radial and down-track offset) between three read elements.

The control circuitry 24 may also employ any suitable technique to measure the radial offset of the read elements. FIG. 14 illustrates an embodiment for measuring the radial offset between three read elements $22_1$-$22_3$. While servoing the head near a middle diameter of the disk surface based on reading servo data from the disk using at least one of the read elements $22_1$-$22_3$, a test pattern is written to the disk using a write element 112. The test pattern is then read from the disk using each read element while scanning the head radially over the test pattern and generating an amplitude profile as shown in FIG. 14. The relative radial offset between the read elements $22_1$-$22_3$ may be measured based on when the peak in the amplitude profile occurs for each read element as the head is scanned radially over the test pattern starting from an initial position (as determined from the servo data).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk surface comprising a plurality of servo tracks;
   a head actuated over the disk surface, wherein the head comprises at least two read elements including a first read element and a second read element, and at least two of the read elements are offset radially relative to a center of the two read elements by at least a width of a servo track at all radial locations of the head over the disk surface; and
   control circuitry to:
      read first servo data recorded in a first servo track using the first read element to generate a first read signal;
      read second servo data recorded in a second servo track using the second read element to generate a second read signal; and
      servo the head over the disk surface based on at least the first read signal and the second read signal.

2. The data storage device as recited in claim 1, wherein during a read operation, the control circuitry is further configured to read user data recorded on the disk surface using the first read element without reading user data recorded on the disk surface using the second read element.

3. The data storage device as recited in claim 1, wherein a center of the first read element is offset radially from a center of the second read element by at least a width of a servo track at all radial locations of the head over the disk surface.

4. The data storage device as recited in claim 1, wherein:
   the head comprises a third read element;
   a center of the first read element is offset radially from a center of the second read element by at least a width of a servo track over a first radial band of the servo tracks; and
   a center of the first read element is offset radially from a center of the third read element by at least a width of a servo track over a second radial band of the servo tracks, wherein the first radial band is different from the second radial band.

5. The data storage device as recited in claim 4, wherein when the head is within the second radial band the control circuitry is further configured to:
   read third servo data recorded in a third servo track on the disk surface using the third read element to generate a third read signal; and
   servo the head over the disk surface based on at least the first read signal and the third read signal.

6. The data storage device as recited in claim 5, wherein during a read operation, the control circuitry is further configured to read user data recorded on the disk surface in the second radial band using the first read element without reading user data recorded on the disk surface using the third read element.

7. A method of operating a data storage device, the method comprising:
   reading first servo data recorded in a first servo track using a first read element to generate a first read signal;
   reading second servo data recorded in a second servo track using a second read element to generate a second read signal; and servoing a head over a disk surface based on at least the first read signal and the second read signal, wherein:

the disk surface comprises a plurality of servo tracks including the first servo track and the second servo track, and the head comprises at least two read elements including the first read element and the second read element, and at least two of the read elements are offset radially relative to a center of the two read elements by at least a width of a servo track at all radial locations of the head over the disk surface.

8. The method as recited in claim 7, wherein during a read operation, the method further comprises reading user data recorded on the disk surface using the first read element without reading user data recorded on the disk surface using the second read element.

9. The method as recited in claim 7, wherein a center of the first read element is offset radially from a center of the second read element by at least a width of a servo track at all radial locations of the head over the disk surface.

10. The method as recited in claim 7, wherein:

the head comprises a third read element;

a center of the first read element is offset radially from a center of the second read element by at least a width of a servo track over a first radial band of the servo tracks; and a center of the first read element is offset radially from a center of the third read element by at least a width of a servo track over a second radial band of the servo tracks, wherein the first radial band is different from the second radial band.

11. The method as recited in claim 10, wherein when the head is within the second radial band the method further comprises:

reading third servo data recorded in a third servo track on the disk surface using the third read element to generate a third read signal; and servoing the head over the disk surface based on at least the first read signal and the third read signal.

12. The method as recited in claim 11, wherein during a read operation, the method further comprises reading user data recorded on the disk surface in the second radial band using the first read element without reading user data recorded on the disk surface using the third read element.

13. Control circuitry for use in a data storage device, the control circuitry configured to:

read first servo data recorded in a first servo track using a first read element to generate a first read signal;

read second servo data recorded in a second servo track using a second read element to generate a second read signal; and servo a head over a disk surface based on at least the first read signal and the second read signal, wherein:

the disk surface comprises a plurality of servo tracks including the first servo track and the second servo track, and the head comprises at least two read elements including the first read element and the second read element, and at least two of the read elements are offset radially relative to a center of the two read elements by at least a width of a servo track at all radial locations of the head over the disk surface.

14. The control circuitry as recited in claim 13, wherein during a read operation, the control circuitry is further configured to read user data recorded on the disk surface using the first read element without reading user data recorded on the disk surface using the second read element.

15. The control circuitry as recited in claim 13, wherein a center of the first read element is offset radially from a center of the second read element by at least a width of a servo track at all radial locations of the head over the disk surface.

16. The control circuitry as recited in claim 13, wherein:

the head comprises a third read element;

a center of the first read element is offset radially from a center of the second read element by at least a width of a servo track over a first radial band of the servo tracks; and a center of the first read element is offset radially from a center of the third read element by at least a width of a servo track over a second radial band of the servo tracks, wherein the first radial band is different from the second radial band.

17. The control circuitry as recited in claim 16, wherein when the head is within the second radial band the control circuitry is further configured to:

read third servo data recorded in a third servo track on the disk surface using the third read element to generate a third read signal; and servo the head over the disk surface based on at least the first read signal and the third read signal.

18. The control circuitry as recited in claim 17, wherein during a read operation, the control circuitry is further configured to read user data recorded on the disk surface in the second radial band using the first read element without reading user data recorded on the disk surface using the third read element.

* * * * *